Patented June 30, 1931

1,812,542

UNITED STATES PATENT OFFICE

JULIUS A. NIEUWLAND, OF NOTRE DAME, INDIANA, ASSIGNOR TO E. I. DU PONT DE NEMOURS & COMPANY, OF WILMINGTON, DELAWARE, A CORPORATION OF DELAWARE

CATALYTIC PROCESS FOR THE PREPARATION OF VINYL CHLORIDE

No Drawing. Application filed October 12, 1927, Serial No. 225,848. Renewed March 22, 1930.

This invention relates to a process of preparing vinyl chloride and comprises reacting upon acetylene with hydrochloric acid in the presence of a suitable catalyst.

It is one of my objects to prepare vinyl chloride in an efficient and economical manner. Other objects will appear from the description.

In one of the specific embodiments of the invention, a mixture of 1,000 grams ammonium chloride, 1,000 grams hydrochloric acid of specific gravity approximately 1.194 (or greater), 3,000 grams cuprous chloride and 100 grams copper powder is agitated thoroughly while passing into it acetylene gas. Rapid absorption of the gas takes place with the formation of a gray to almost white precipitate. The temperature may rise as high as 40° C. during the reaction with no injurious effect other than a diminution in the absorption rate, but it is preferable to hold the temperature down to about 20° C. by suitable cooling of the reaction mixture. The acetylene may be passed in at atmospheric or higher pressures, preferably the latter. When the reaction slows up, as shown by a marked decrease in the rate of absorption of acetylene, the operation is discontinued and the vinyl chloride, together with some hydrochloric acid and some acetylene, are evolved from the reaction mixture by the application of heat. Any water lost in this distillation is replaced in the reaction mass, which, after cooling and saturating with dry gaseous hydrochloric acid, is again ready for the absorption of acetylene. This cycle of operation can be repeated indefinitely and a given lot of copper thus used to bring about the reaction of an indefinite amount of acetylene and hydrochloric acid.

In preparing the absorbing mixture, the preceding proportions need not be adhered to rigidly. It is sufficient that the amount of ammonium chloride used be sufficient to effect substantially complete saturation of the liquid phase and that the cuprous chloride be more than sufficient for complete saturation. The hydrochloric acid may be the ordinary concentrated aqueous solution or may be richer in hydrochloric acid. The function of the copper powder is merely to insure that all of the combined copper is present in the cuprous form, as cupric copper causes undesirable side reactions until the reduction of the cupric copper has been effected by acetylene. Cupric copper is, therefore, best reduced with copper before starting.

Equivalents may be used for the chemicals named, as for example, a mixture of cupric chloride and a reducing agent may be substituted for cuprous chloride and a substituted ammonia such as other ammonium salts or ordinary ammonia may be used in place of ammonium chloride. The reaction mass may be suspended in or intermingled with a liquid immiscible with water, such as chlorbenzene, to facilitate agitation of the mass.

The method of carrying out the absorption described may be varied to a large extent. As has been stated, acetylene may be introduced into the absorption mixture under pressure, and the pressure may be maintained upon such mixture for a suitable length of time to permit complete absorption and reaction. Under these circumstances, air will of course be excluded. If desired, the reaction mixture may be kept at elevated temperatures to assist in carrying out the desired reactions. Instead of making up a mixture containing hydrochloric acid, the steps of the process may be changed to absorb the acetylene in the cuprous chloride-ammonium chloride mixture, with a subsequent introduction of hydrochloric acid gas under pressure into the absorption mixture.

It is to be understood that I do not limit myself by the foregoing description and preferred embodiment of the invention, as various changes may be made therein by those skilled in the art; the proper limits of the invention being defined in the appended claims.

I claim:

1. The process of preparing vinyl chloride which comprises reacting upon acetylene with hydrochloric acid, in the presence of a cuprous compound.

2. The process of preparing vinyl chloride which comprises reacting upon acetylene with hydrochloric acid, in a solution of a cuprous compound.

3. The process of preparing vinyl chloride which comprises reacting upon acetylene with hydrochloric acid, in an aqueous solution of cuprous chloride and ammonium chloride.

4. The process of preparing vinyl chloride which comprises reacting upon acetylene with hydrochloric acid in an aqueous solution of a cuprous compound and an ammonium salt.

5. The process of claim 3 in which the reaction is carried out under pressures above atmospheric.

6. The process of claim 3 in which the temperature is kept below 40° C. during the reaction.

7. The process of preparing vinyl chloride which comprises absorbing acetylene in an aqueous solution of a cuprous compound and an ammonium salt, and adding hydrochloric acid to the mixture after the absorption.

8. The process of preparing vinyl chloride which comprises reacting upon acetylene with hydrochloric acid in the presence of an aqueous solution of cuprous chloride and a liquid immiscible with water, agitating the liquids during the reaction, drawing off the immiscible liquid with the vinyl chloride absorbed therein, and recovering the vinyl chloride from said liquid by distillation.

9. The process of preparing vinyl chloride which comprises reacting upon acetylene with hydrochloric acid in an aqueous solution of ammonium chloride and cuprous chloride, said solution containing copper powder suspended therein.

10. The process of claim 7 in which the hydrochloric acid is added under pressures above atmospheric.

11. The process of preparing vinyl chloride which comprises reacting upon acetylene with hydrochloric acid in the presence of an aqueous solution of a cuprous compound and a liquid immiscible with water.

12. The process of preparing vinyl chloride which comprises reacting upon acetylene with hydrochloric acid in an aqueous solution of a cuprous compound and an ammonium salt under conditions preventing the formation of cupric copper.

13. The process of preparing vinyl chloride which comprises reacting upon acetylene with hydrochloric acid in an aqueous solution of a cuprous compound and an ammonium salt in the presence of metallic copper.

14. The process of preparing vinyl chloride which comprises passing acetylene into an aqueous mixture prepared from substantially 1000 parts of ammonium chloride, substantially 1000 parts of hydrochloric acid, (sp. gr. at least 1.194), substantially 3000 parts of cuprous chloride and 100 parts of copper powder.

15. The process of claim 2 wherein the solution is aqueous and is saturated with cuprous chloride.

16. The process of claim 2 wherein the solution is aqueous and saturated with cuprous chloride and ammonium chloride.

In testimony whereof, I affix my signature.

JULIUS A. NIEUWLAND.